Patented Jan. 18, 1949

2,459,359

UNITED STATES PATENT OFFICE 2,459,359

PURIFICATION OF BETA-PICOLINE

Robert S. Bowman, Pittsburgh, Pa., assignor to Jones & Laughlin Steel Corporation, Pittsburgh, Pa., a corporation of Pennsylvania No Drawing. Application January 7, 1947,
Serial No. 720,675

9 Claims. (Cl. 260—290)

This invention relates to the purification of the 3- or beta-picoline component of the "beta-gamma-picoline fraction" obtained from coal tar or coke oven gas, and more particularly to a process in which the purification is accomplished by a chemical reaction.

An object of the invention is to obtain 3-picoline of high purity. Another object is the provision of a commercially practicable process for such purification. Other objects will become evident from the description of my process.

The fraction of coal-tar pyridine bases boiling from 142° C. to 145° C. is known as the "beta-gamma-picoline fraction" and is composed of beta- or 3-picoline, which boils at 144.0° C. gamma or 4-picoline, which boils at 144.6° C., and 2, 6-lutidine, which boils at 144.4° C. All three components are industrially useful, particularly 3-picoline, from which nicotinic acid or "niacin" can be made by a simple process. Because of the virtual coincidence of their boiling points, and the complete miscibility of all these isomers with water, alcohols, ketones, and hydrocarbon solvents, they cannot be separated by conventional distillation or solvent extraction processes. Several processes for their separation have been devised, none of which has been entirely successful in producing 3-picoline of high purity at a reasonable cost. However, it is practical to increase substantially the concentration of 3-picoline by partial separation of 4-picoline and 2, 6-lutidine, or by isomerization of 4-picoline to 3-picoline.

My invention is specifically adapted to the further purification of this concentrated 3-picoline fraction, although it is not confined to this concentrate. I have discovered that if a mixture of 3-picoline, 4-picoline, and 2, 6-lutidine is treated with formaldehyde and an acid salt of a secondary amine, under proper conditions, the 4-picoline and 2, 6-lutidine take part in a condensation reaction with added agents, while the 3-picoline remains unreacted. This 3-picoline can then be separated by extraction of the reaction mixture with a suitable solvent, followed by fractional distillation of the extract. In this way a material having a purity exceeding 95% can be readily obtained. A portion of the secondary amine can be recovered from the reaction mixture by further operations of regeneration, distillation and extraction.

The process of my invention may be carried out in various ways. An embodiment which I have found to give satisfactory results comprises the following series of operations: To the 3-picoline concentrate are added formaldehyde and a secondary amine each in a quantity of 1½ to 2 mols per mol of total 4-picoline and 2, 6-lutidine present. The secondary amine is then converted into an acid salt by the addition of an appropriate quantity of a mineral acid in water. The mixture is heated to a temperature not above about 100° C. until the desired condensation has occurred, which may be within one-half to two hours, depending on temperature and the final purity desired. The reaction mixture is then cooled and water is added. The unreacted 3-picoline is removed from the mixture by extraction with a suitable hydrocarbon solvent, and recovered in a dry, purified form by fractional distillation of the solvent extract.

The yield of 3-picoline may be increased somewhat by steam distilling the raffinate from the above extraction. The distillate is extracted with a suitable hydrocarbon solvent, as before, and the 3-picoline again recovered by fractional distillation of the hydrocarbon extract. This fractional distillation will, incidentally, also yield a certain quantity of vinyl pyridine derivatives.

A portion of the secondary amine can be recovered by alkalizing the residue of the steam distillation referred to in the foregoing paragraph, steam distilling this mixture, extracting the distillate with a hydrocarbon solvent, and finally fractionally distilling the solvent extract.

Having described in a general way the process of my invention, I now make more specific reference to certain of the steps. The formaldehyde employed in the first operation may be added either in a water solution, or as paraformaldehyde. In this latter case it is desirable to add water to the reaction mixture.

The secondary amine employed may be any secondary amine, saturated or unsaturated, and may be added as a free amine, together with sufficient acid to form an acid salt, or directly as an acid salt, whichever is more convenient. If the first course is followed, any common mineral acid, such as sulfuric, is added in amount stoichiometrically equivalent to the free amine. Classes of secondary amines which may be used, together with specific examples of each are:

| Class | Example |
|---|---|
| Dialkylamines | Diethylamine or dicyclohexylamine |
| Diarylamines | Diphenylamine |
| Alkylarylamines | Methylaniline |
| Heterocylic amines | Morpholine |
| Homocyclic amines | Piperdine |
| Substituted dialkyl-amines | Diethanolamine |

These classes of secondary amines and the examples are given only by way of illustration and not by way of limitation. If acid salts are used they may be the sulfates or hydrochlorides, for example, of any of the above.

An alternative first step in my process consists in acidifying the 3-picoline concentrate to convert the picolines into their acid salts, and then reacting them with formaldehyde and a free secondary amine, utilizing no additional acid. If this course is followed the picoline salts will be formed in quantity stoichiometrically equivalent to the secondary amine only.

The hydrocarbon solvent employed for extraction of the unreacted 3-picoline and also for the recovery of the secondary amine may be benzene or toluene. In the recovery of the secondary amine the alkalization of the residue may be accomplished with any convenient base, such as sodium hydroxide.

As a specific example of my process I may take 43 pounds of a mixture containing about 70% 3-picoline, the balance being 4-picoline and 2,6-lutidine, to which I add 23 pounds of 37% water solution of formaldehyde, 28 pounds of diethanolamine, and 13.7 pounds of sulfuric acid. This mixture is heated to about 100° C. for a period of about an hour, when the desired condensation reaction will be substantially completed. It is then cooled, and water added. The mixture is extracted with benzene and the benzene extract distilled to yield 28.5 pounds of 3-picoline having a purity of 95% or better.

The invention is not limited to the preferred embodiment but may be otherwise embodied or practiced within the scope of the following claims.

I claim:

1. The process of purifying 3-picoline that is contaminated with at least one of the bases 4-picoline and 2,6-lutidine, comprising heating to a temperature not exceeding about 100° C. for about one-half hour to about two hours the contaminated 3-picoline with formaldehyde and an acid salt of a secondary amine adding water and extracting and recovering 3-picoline having a purity at least of approximately 95% from the reaction products.

2. The process of purifying 3-picoline that is contaminated with at least one of the bases 4-picoline and 2,6-lutidine, comprising heating to a temperature not exceeding about 100° C. for about one-half hour to about two hours the contaminated 3-picoline with formaldehyde, a secondary amine, and a mineral acid, adding water and extracting and recovering 3-picoline having a purity at least of approximately 95% from the reaction products.

3. The process of purifying 3-picoline that is contaminated with at least one of the bases 4-picoline and 2,6-lutidine, comprising heating to a temperature not exceeding 100° C. for about one-half to about two hours the contaminated 3-picoline with formaldehyde and an acid salt of a secondary amine, adding water and extracting the unreacted 3-picoline from the reaction products with a hydrocarbon solvent, steam distilling the raffinate from said extraction and extracting additional 3-picoline from the distillate with a hydrocarbon solvent, the recovered 3-picoline having a purity at least of approximately 95%.

4. The process of purifying 3-picoline that is contaminated with at least one of the bases 4-picoline and 2,6-lutidine, comprising heating the contaminated 3-picoline to a temperature not exceeding about 100° C. for about one-half hour to about two hours with formaldehyde and an acid salt of a secondary amine, adding water and extracting the unreacted 3-picoline from the reaction products with a hydrocarbon solvent, and distilling the solvent to recover 3-picoline having a purity at least of approximately 95%.

5. The process of purifying 3-picoline that is contaminated with at least one of the bases 4-picoline and 2,6-lutidine, comprising heating to a temperature not exceeding about 100° C. for about one-half hour to about two hours the contaminated 3-picoline with formaldehyde and an acid salt of a secondary amine, adding water and extracting the unreacted 3-picoline from the reaction products with a hydrocarbon solvent, steam distilling the raffinate from said extraction, extracting additional 3-picoline from the distillate with a hydrocarbon solvent, alkalizing the residual mixture remaining after said steam distillation, and recovering a portion of said secondary amine by steam distilling said alkaline mixture and extracting with a hydrocarbon solvent, the recovered 3-picoline having a purity at least of approximately 95%.

6. The process of purifying 3-picoline that is contaminated with at least one of the bases 4-picoline and 2,6-lutidine comprising heating to a temperature about 100° C. for about an hour the contaminated 3-picoline with formaldehyde and an acid salt of diethanolamine, adding water and extracting the unreacted 3-picoline from the reaction products with benzene, and recovering therefrom 3-picoline having a purity at least of approximately 95%.

7. The process of purifying 3-picoline that is contaminated with both 4-picoline and 2,6-lutidine, comprising heating to a temperature not exceeding about 100° C. for about one-half hour to about two hours the contaminated 3-picoline with formaldehyde and an acid salt of a secondary amine, adding water, and extracting and recovering 3-picoline having a purity at least of approximately 95% from the reaction products.

8. The process of purifying 3-picoline that is contaminated with at least one of the bases 4-picoline and 2,6-lutidine, comprising acidifying the picolines to convert them into their acid salts, and then heating them with formaldehyde and a free secondary amine to a temperature not exceeding about 100° C. for about one-half hour to about two hours, adding water and extracting and recovering 3-picoline having a purity at least of approximately 95% from the reaction products.

9. The process of purifying 3-picoline concentrate that is contaminated with both 4-picoline and 2,6-lutidine, comprising adding to the concentrate formaldehyde and a secondary amine each in a quantity of 1½ to 2 mols per mol of total 4-picoline and 2,6-lutidine present, adding mineral acid thereto to convert the secondary amine to an acid salt, heating the mixture to a temperature not exceeding about 100° C. for about one-half hour to about two hours, cooling the reaction mixture and adding water thereto, extracting the 3-picoline with a hydrocarbon solvent, and recovering dry 3-picoline having a purity at least of approximately 95% by fractionally distilling the solvent extract.

ROBERT S. BOWMAN.

REFERENCES CITED

The following references are of record in the file of this patent:

UNITED STATES PATENTS

| Number | Name | Date |
|---|---|---|
| 2,272,159 | Cislak | Feb. 3, 1942 |
| 2,338,571 | Cislak | Jan. 4, 1944 |
| 2,388,499 | Riethof | Nov. 6, 1945 |
| 2,402,667 | Riethof | June 25, 1946 |

OTHER REFERENCES

Feo: Compte Rendue, 192 (1931), pp. 1242-1244.

Chem. Abstracts, vol. 25, p. 4270.

Maier: "Das Pyridine und Seine Derivative," 1934, pp. 30, 31, 33, 35, 36.

Certificate of Correction

Patent No. 2,459,359.    January 18, 1949.

ROBERT S. BOWMAN

It is hereby certified that error appears in the printed specification of the above numbered patent requiring correction as follows:

Column 1, lines 15 and 16, for "gamma or" read *gamma- or*;
and that the said Letters Patent should be read with this correction therein that the same may conform to the record of the case in the Patent Office.

Signed and sealed this 17th day of May, A. D. 1949.

[SEAL]

THOMAS F. MURPHY,
*Assistant Commissioner of Patents.*